July 5, 1966  Z. J. JANIA  3,259,222
FRICTION CLUTCH WITH VIBRATION DAMPER
Filed Sept. 1, 1964  6 Sheets-Sheet 2
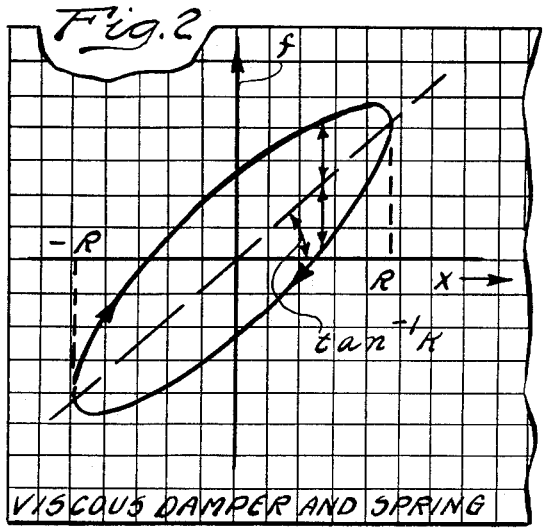
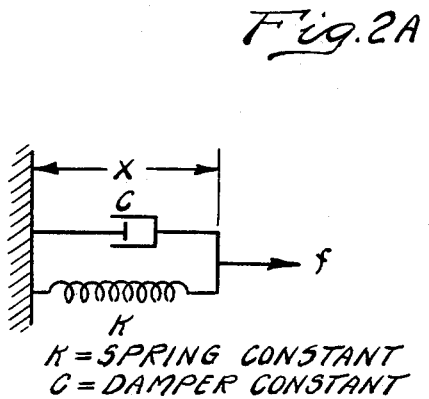
$K$ = SPRING CONSTANT
$C$ = DAMPER CONSTANT
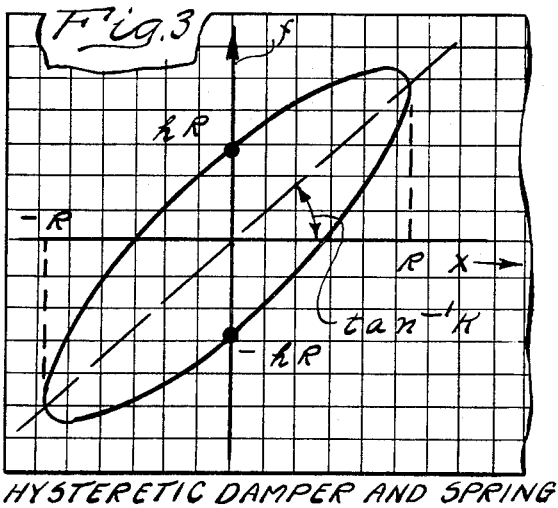
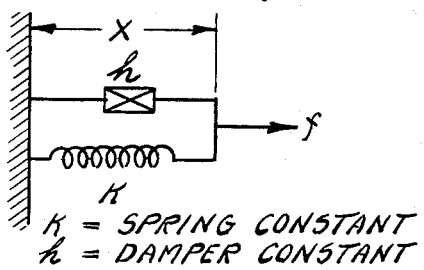
$K$ = SPRING CONSTANT
$h$ = DAMPER CONSTANT
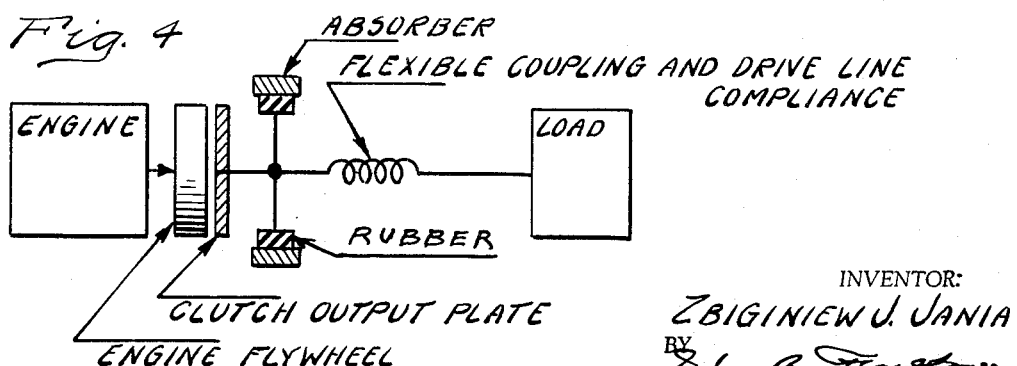
INVENTOR:
ZBIGINIEW J. JANIA
ATTORNEYS.

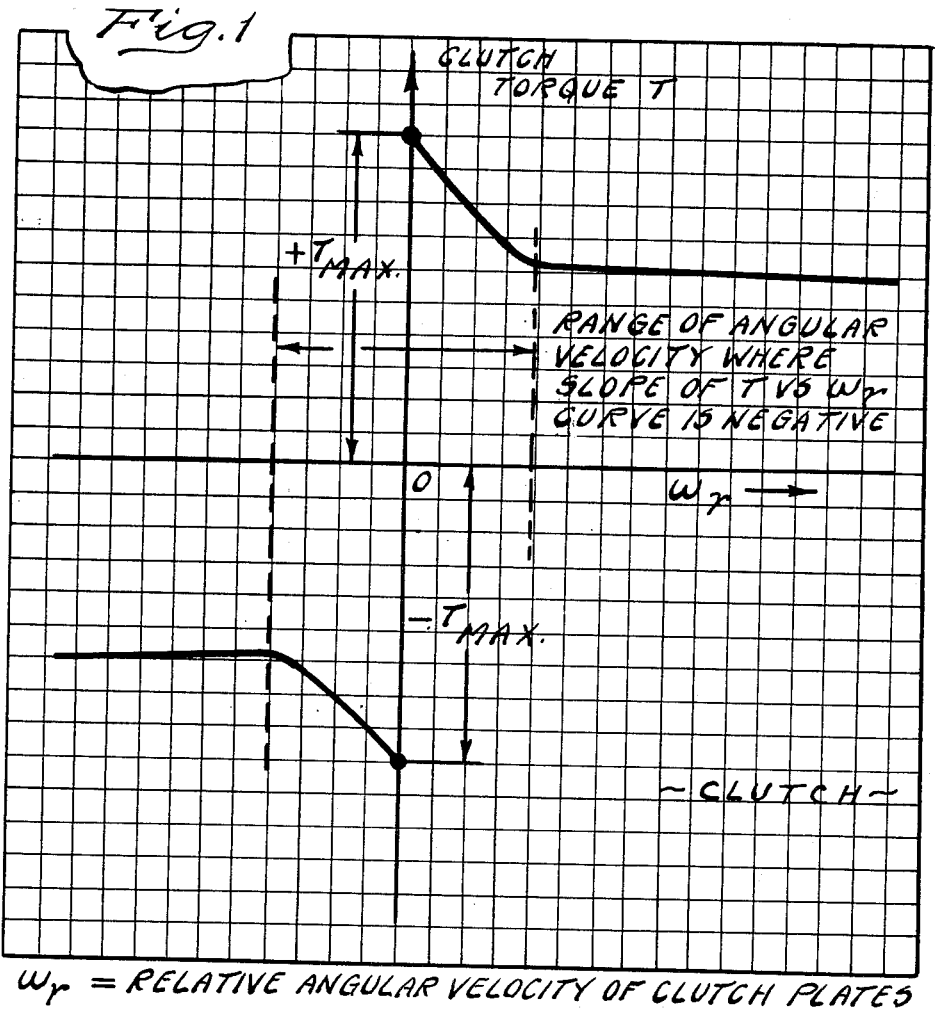
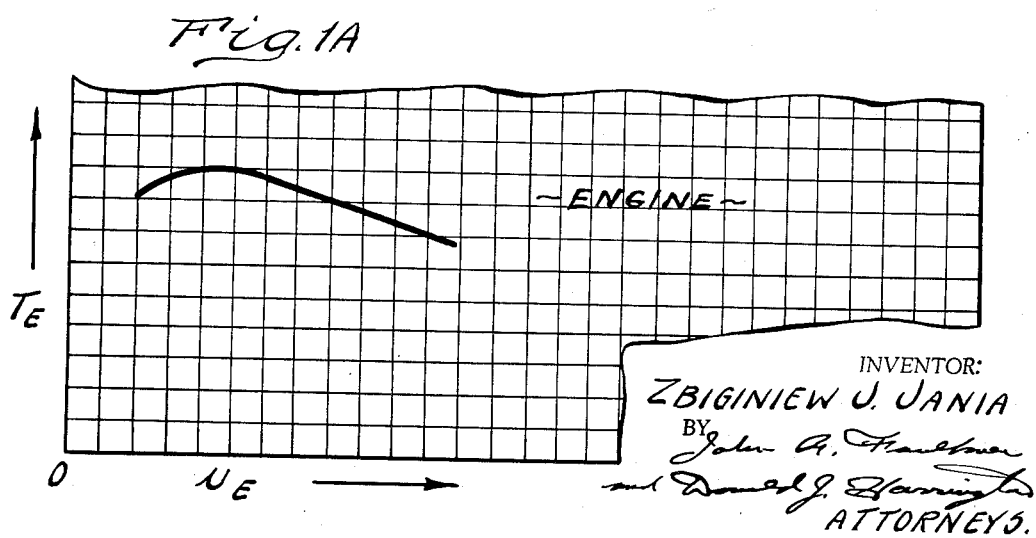

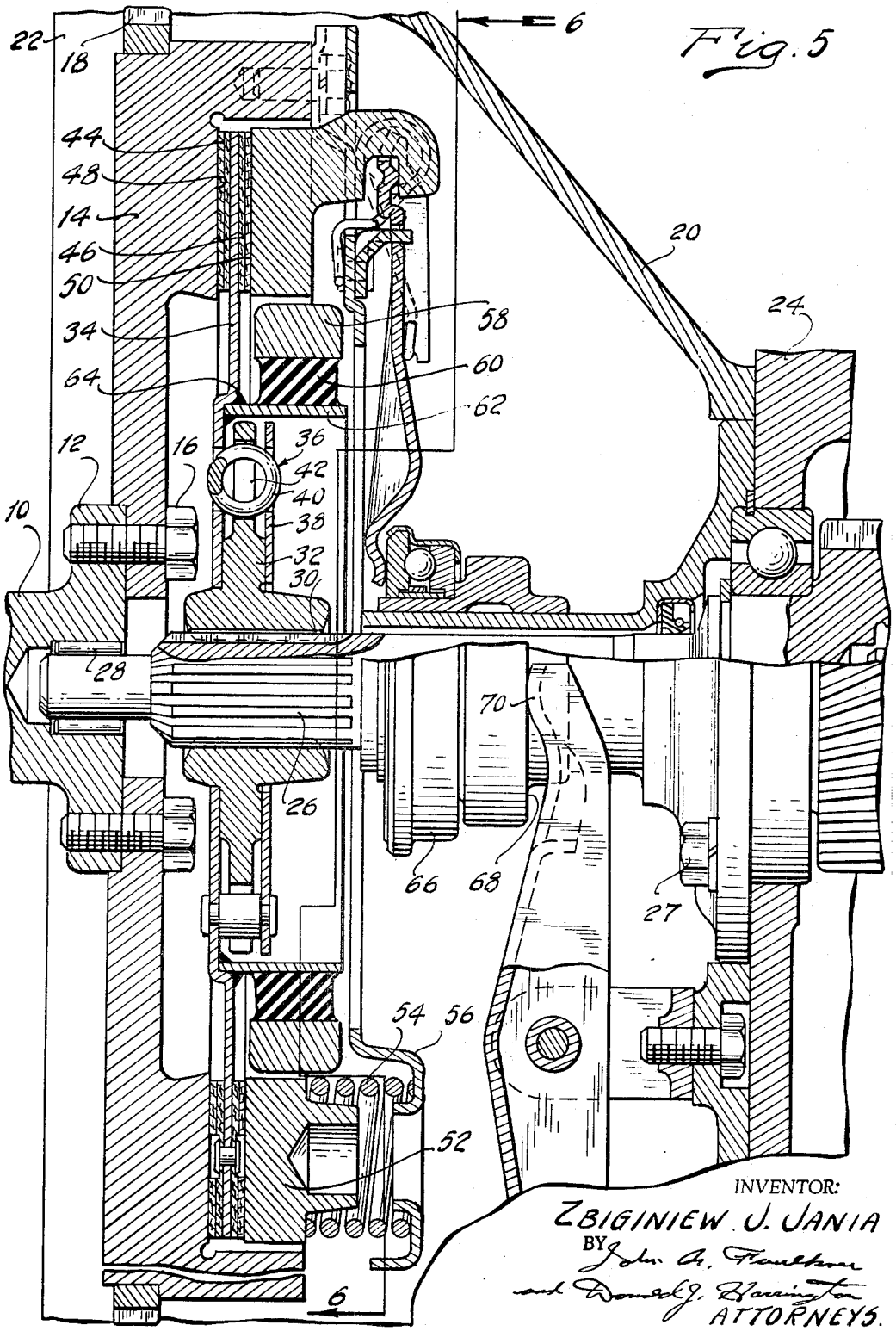

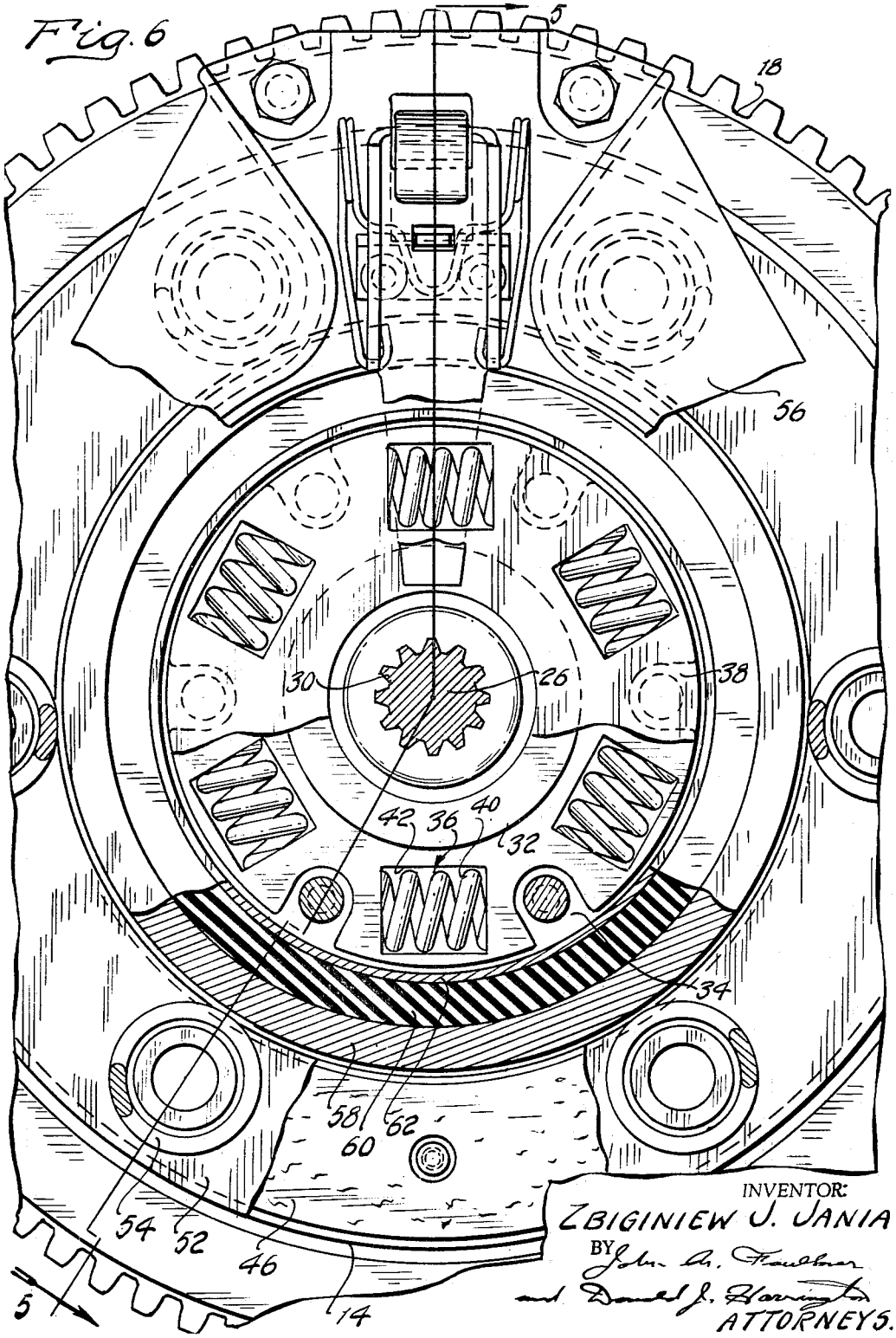

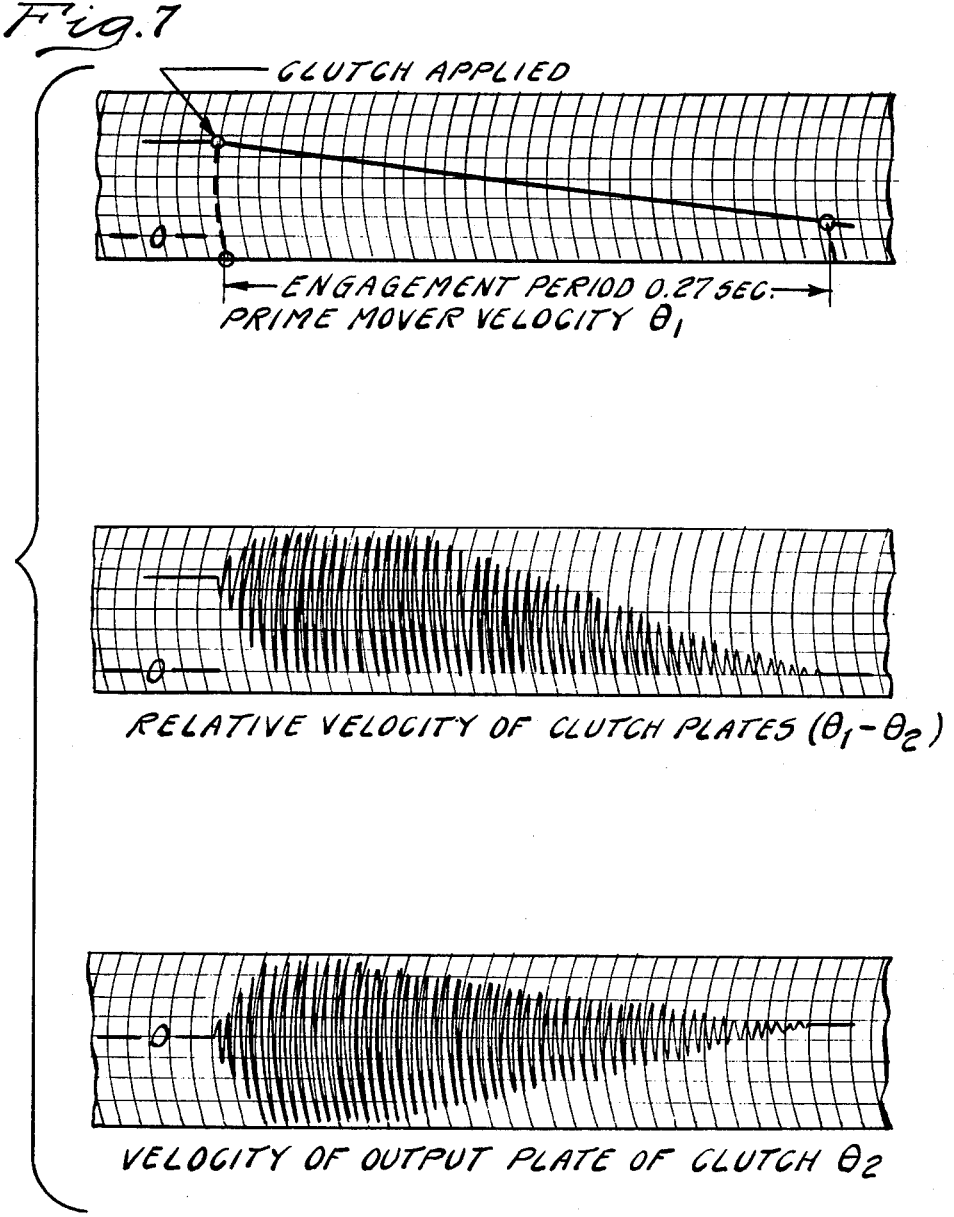

July 5, 1966  Z. J. JANIA  3,259,222
FRICTION CLUTCH WITH VIBRATION DAMPER
Filed Sept. 1, 1964  6 Sheets-Sheet 6
*Fig. 8*
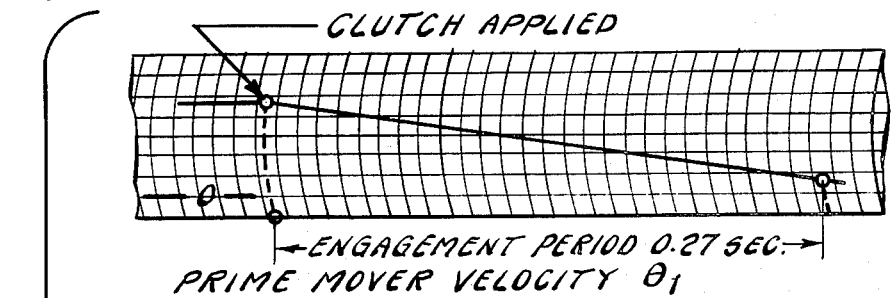
PRIME MOVER VELOCITY $\theta_1$
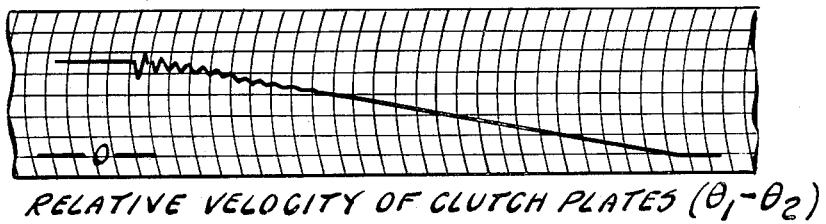
RELATIVE VELOCITY OF CLUTCH PLATES $(\theta_1 - \theta_2)$
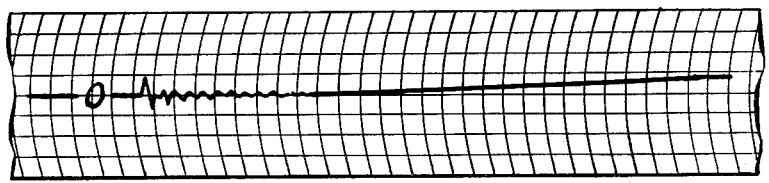
VELOCITY OF OUTPUT PLATE OF CLUTCH $\theta_2$
INVENTOR:
ZBIGINIEW J. JANIA
BY
ATTORNEYS.

# United States Patent Office 3,259,222
Patented July 5, 1966

3,259,222
FRICTION CLUTCH WITH VIBRATION DAMPER
Zbigniew J. Jania, Detroit, Mich., assignor to Ford Motor Company, Dearborn, Mich., a corporation of Delaware
Filed Sept. 1, 1964, Ser. No. 393,559
5 Claims. (Cl. 192—68)

My invention relates generally to a torque delivery system having a selectively engageable friction clutch, and more particularly to an improved tuned vibration system for absorbing undesired vibration forces in an automotive vehicle driveline during application of a selectively engageable friction clutch.

A design shortcoming that often is apparent in automotive vehicle drivelines having a selectively engageable neutral clutch with dry friction clutch surfaces is the so-called "clutch chatter" that occurs during clutch engagement as the driveline is conditioned for acceleration. This characteristic, which may be described appropriately as "stick slip" motion of the clutch plates, is due to the fact that the clutch frictional torque and the relative angular velocity of the clutch discs are inversely related for a substantial range in values of the angular velocity. This is shown in the accompanying drawings in FIGURE 1.

If we assume that the vehicle engine has the usual speed-torque characteristic as illustrated in FIGURE 1A, the negative slope of the chart of FIGURE 1 causes any small vibration of the friction elements of the clutch to increase until the amplitude of the relative velocity $\omega_r$ becomes negative. When this occurs, energy is dissipated, oscillations decrease and the clutch finally assumes a fully engaged, locked-up condition.

In any friction clutch of this type where the torque is not externally controlled, the frictional torque $M_c$ may be expressed as follows:

(1)  $\qquad M_c = f(\theta_1 - \theta_2)$ where $\theta_1$ and $\theta_2$ are the velocities of the input friction disc and the output friction disc, respectively. This relationship is represented graphically in FIGURE 1.

In order to state the problem more clearly, it is desirable to express mathematically the behavior of any dynamic system of which a friction clutch forms a part. In doing this one may consider first a simple mechnical oscillator consisting of a mass $m$, a spring of constant $k$ and a damper of constant $\alpha$. The equation of motion for such a mechanical oscillator is (2)  $\qquad m\ddot{x} + \alpha \dot{x} + kx = 0$ If one multiples this expression by $\dot{x}$ and integrates from time=0 to time=$\tau$, the result is:

(3)  $\qquad \left[\dfrac{m(\dot{x})^2}{2}\right]_0^\tau + \left[\dfrac{kx^2}{2}\right]_0^\tau = -\alpha \int_0^\tau (\dot{x})^2 dt$ The sum of the left-hand side of Equation 3 represents the variation of the total energy, kinetic plus potential, during the engagement time $\tau$. This variation can be either positive or negative depending upon the sign of the quantity $\alpha$. If $\alpha$ is positive, the variation of the total energy is negative and the system loses energy as $\tau$ approaches infinity. In a system without a source of energy, this is not physically possible. The symbol $\alpha$ represents the slope of the friction-speed characteristic of the damper.

A power transmission system of the type disclosed herein consists of three essential elements; namely, a source of energy such as an internal combustion vehicle engine, a selectively engageable friction clutch for controlling the distribution of power to the vehicle wheels and a load on the output side of the clutch.

Since the presence of inertia and compliance is inevitable in such a system, the entire system may become oscillatory following the application of the clutch. If the clutch characteristic curve has anywhere in it a portion with a negative slope, these oscillations will tend to build-up, as suggested by Equation 1, until they are limited by some non-linearity in the system.

If the energy supplied to the vibrating system through the negative damping characteristic of the clutch can be dissipated at a rate that is sufficiently large, the system will be asymptotically stable. Hence, any vibration induced in the system would be damped until its amplitude woud become zero and the clutch finally locks up as $\omega_r = 0$. According to a principal feature of my invention, I have provided a means for dissipating energy in a driveline of the type described in the foregoing paragraphs. I have done this by adding another oscillating system consisting of a small flywheel of moment of inertia $I_d$. This flywheel is attached to the system between the clutch and the load by means of a parallel combination of a spring and a viscous damper. I have strategically arranged these elements to provide positive damping and asymptotic stability as distinguished from an arrangement in which the amplitude of the vibrations are merely decreased rather than damped.

It is well known that rubber, either natural or synthetic, possesses both resilience and hysteresis. Therefore, it can be used advantageously to provide a connection between the inertia absorber and the output clutch plate. It can be shown that the system thus obtained is very similar to a linear vibration absorber in which damping is proportional to velocity. In FIGURE 2, I have shown the characteristics of a viscous damper and a linear spring of rate K which are expressed in the following manner:

(4)  $X = R \sin \omega t$, where $X$ = spring extension (5)  Then the force = $f = KX + C\dot{X}$
$\qquad\qquad = KR \sin \omega t + CR\omega \cos \omega t$ (6)  Therefore, $f = KX \pm C\omega\sqrt{R^2 - X^2}$ (7)  and $E_v = CR^2\pi\omega$, where $E_v$ = energy dissipated per cycle FIGURE 3 shows corresponding characteristics for a hysteretic damper and a linear spring which may be considered to be an ideal representation of the proposed vibration damper shown in FIGURES 4 and 5. It can be shown that energy dissipated per cycle is given by $E_h = hR^2\pi$ where $h$ is the hysteretic damping coefficient. In the case of FIGURE 3 the relation of $f$ and $x$ is given by the expression (8)  $\qquad f = KX \pm h\sqrt{R^2 - X^2}$ and is independent of frequency. It follows that a hysteretic damper-spring combination can be made approximately equivalent to a viscous damper-spring combination at a particular frequency $\omega$. Since the design of vibration absorbers having viscous damping is well known, and since the proposed vibration damper must be tuned to the fundamental frequency of the driveline which is determined mainly for small oscillations by the inertia of the output clutch plate and the spring rate of the flexible coupling, a hysteretic vibration damper having the proper rate of energy dissipation can be designed to stabilize the clutch system.

The provision of a hysteretic damper-spring system of the type above set forth is an object of my invention.

It is a further object of my invention to provide a dry, friction clutch for an automotive vehicle driveline in which provision is made for damping undesired vibration during engagement of the clutch while under torque.

For the purpose of describing a principal embodiment of my invention, reference will be made to the accompanying drawings, wherein:

FIGURE 1 shows the clutch engaging characteristics of a typical dry, friction clutch;

FIGURE 1a shows the speed-torque relationship of a typical internal combustion vehicle engine;

FIGURES 2 and 2a show a spring and dashpot type oscillating system and the relationship between force and displacement;

FIGURES 3 and 3a correspond respectively to FIGURES 2 and 2a although they are concerned with a spring and hysteretic type damper system as distinguished from a dashpot type system;

FIGURE 4 is a schematic representation of my improved system;

FIGURE 5 is a cross sectional view of a working embodiment of the clutch structure of FIGURE 4 taken along the plane of section line 5—5 of FIGURE 6;

FIGURE 6 is a cross sectional view of the structure of FIGURE 5 taken along section line 6—6 of FIGURE 5.

FIGURE 7 shows brush recordings of the oscillations following clutch engagement for a driveline lacking my improved tuned vibration system; and FIGURE 8 shows brush recordings showing the same characteristics illustrated in FIGURE 7 although for a driveline that is provided with the improved damping system of my invention.

In order to describe a preferred embodiment of my system more particularly, reference will be made first to FIGURES 5 and 6 where numeral 10 designates the crankshaft of an internal combustion vehicle engine. It is flanged at 12 to facilitate a bolted connection with an engine flywheel 14, suitable bolts being provided for this purpose. Disposed about the periphery of flywheel 14 is an engine starter ring gear 18.

A clutch housing 20 may be bolted at its periphery 22 to the engine block of the vehicle engine. The inner periphery of the housing 20 is bolted to a transmission housing 24 by bolts 27. Housing 24 contains torque delivery gear elements in a conventional fashion. These elements establish geared power flow paths between a central torque delivery shaft 26 and a power output tailshaft, the latter in turn being connected drivably to the vehicle traction wheels through a suitable driveshaft and differential and axle assembly.

Shaft 26 is piloted within a central pilot opening formed in the crankshaft 10, a suitable bearing 28 being provided for this purpose.

Shaft 26 is splined at 30 to the hub 32 of a friction disc assembly. This assembly includes also a clutch plate 34 that is connected drivably to the hub 32 by means of a damper spring assembly 36. The inner periphery of the disc 34 has secured thereto a companion disc 38. Apertures are formed in the disc 38 and in the inner periphery of the disc 34 for accommodating damper springs 40. A finger 42 connected to the hub 32 projects between a pair of the springs 40, each spring 40 being anchored against the disc 34 and its companion disc 38.

The outer periphery of disc 34 has secured thereto annular friction elements 44 and 46. Friction element 44 is situated directly adjacent an annular friction surface 48 formed on the flywheel 14. Friction element 46 is situated directly adjacent an annular friction surface 50 formed on a pressure plate 52. This plate may be adapted for axial shifting movement with respect to the flywheel 14 although relative rotation between the plate 52 and the flywheel 14 is inhibited. Pressure is applied to the plate 52 by means of a plurality of clutch apply springs 54.

A spring anchor plate 56 is carried by the flywheel 14. The plate 56 is formed with pockets that receive the individual springs 54.

An energy absorbing flywheel 58 is bonded to a body of rubber in the form of an annular ring 60. The inner periphery of the rubber ring 60 is bonded to a ring 62 that is welded at 64 to the disc 34. By preference the plate 62 and the flywheel 58 are situated intermediate the radially outward extremity of the hub 32 and the inner pheriphery of the pressure plate 52.

A clutch throwout bearing of conventional design is shown at 66. It includes an annular shoulder 68 which is engaged by the end of a shifter fork 70. This fork 70 may be urged in either axial direction by the vehicle operator by means of a suitable clutch operating linkage mechanism.

As the ring 66 is shifted in a left-hand direction as viewed in FIGURE 5, pressure plate 52 is moved in a right-hand direction to disengage the clutch disc 34. On the other hand, if a vehicle operator allows the ring 66 to be returned under spring pressure in a right-hand direction, the clutch apply springs 54 then will be allowed to urge the pressure plate 52 into frictional engagement with the disc 34. This establishes a driving connection between the flywheel 14 and the shaft 26. The damper springs 40, the flywheel 58 and the rubber ring 60 cooperate to define a tuned vibration system that is capable of absorbing the vibration forces as described in the preceding part of this specification.

A schematic representation of the system of FIGURES 5 and 6 is shown in FIGURE 4. The performance of the system is illustrated in FIGURE 8 where I have plotted angular velocity against time. The damping characteristics can best be appreciated when FIGURE 8 is compared with FIGURE 7 where I have plotted the corresponding performance characteristics for a nontuned system.

What I claim and desire to secure by U.S. Letters Patent is:

1. A friction clutch assembly in a torque delivery driveline comprising a driving member, a driven member, said driving member being connected to a source of torque, a friction disc having friction surfaces formed thereon, a pressure plate, means for urging said pressure plate into frictional driving engagement with said friction disc thereby establishing a frictional driving connection between said driving member and said clutch plate, damper spring means for connecting the inner periphery of said drive plate with said driven member, an energy absorbing flywheel in the form of a mass radially spaced from the axis of said driven member, and a rubber member bonded to said flywheel and to portions of said disc thereby establishing a viscous connection between said flywheel and said discs, said flywheel and said damper spring means cooperating with the torque delivery elements of said clutch system to provide positive, hysteretic damping of vibration forces established during clutch engagement thereby achieving asymptotic stability of the system.

2. A friction clutch assembly in a torque delivery driveline comprising a driving member, a driven member, said driving member being connected to a source of torque, a friction disc having friction surfaces formed thereon, a pressure plate, means for urging said pressure plate into frictional driving engagement with said friction disc thereby establishing a frictional driving connection between said driving member and said clutch plate, damper spring means for connecting the inner periphery of said drive plate with said driven member, an energy absorbing flywheel in the form of a ring surrounding the axis of said driven member, a rubber ring bonded to said flywheel and to portions of said disc thereby establishing a viscous connection between said flywheel and said discs, said flywheel and said damper spring means cooperating with the torque delivery elements of said clutch system to provide positive, hysteretic damping of vibration forces established during clutch engagement thereby achieving asymptotic stability of the system, and manually operable means for urging said pressure plate out of frictional engagement with said friction disc against the opposing influence of said disc engaging means.

3. A friction clutch assembly in a torque delivery driveline comprising a driving member, a driven member, said driving member being connected to a source of torque, a friction disc having friction surfaces formed thereon, a pressure plate, means for urging said pressure plate into frictional driving engagement with said friction disc thereby establishing a frictional driving connection between said driving member and said clutch plate, damper spring means for connecting the inner periphery of said drive plate with said driven member, an energy absorbing flywheel in the form of a ring surrounding the axis of said driven member, and a rubber ring bonded to said flywheel and to portions of said disc thereby establishing a viscous connection between said flywheel and said discs, said flywheel and said damper spring means cooperating with the torque delivery elements of said clutch system to provide positive, hysteretic damping of vibration forces established during clutch engagement thereby achieving asymptotic stability of the system, said disc engaging means comprising springs carried by said driving member and engageable with said pressure plate, said springs providing the sole clutch engaging force.

4. A friction clutch assembly in a torque delivery driveline comprising a driving member, a driven member, said driving member being connected to a source of torque, a friction disc having friction surfaces formed thereon, a pressure plate, means for urging said pressure plate into frictional driving engagement with said friction disc thereby establishing a frictional driving connection between said driving member and said clutch plate, damper spring means for connecting the inner periphery of said drive plate with said driven member, an energy absorbing flywheel in the form of a ring surrounding the axis of said driven member, a rubber ring bonded to said flywheel and to portions of said disc thereby establishing a viscous connection between said flywheel and said discs, said flywheel and said damper spring means cooperating with the torque delivery elements of said clutch system to provide positive, hysteretic damping of vibration forces established during clutch engagement thereby achieving asymptotic stability of the system, and manually operable means for urging said pressure plate out of frictional engagement with said friction disc against the opposing influence of said disc engaging means, said flywheel and said damper spring means being disposed radially, inwardly from said pressure plate to provide minimum dimensions of the assembly.

5. A friction clutch assembly in a torque delivery driveline comprising a driving member, a driven member, said driving member being connected to a source of torque, a friction disc having friction surfaces formed thereon, a pressure plate, means for urging said pressure plate into frictional driving engagement with said friction disc thereby establishing a frictional driving connection between said driving member and said clutch plate, damper spring means for connecting the inner periphery of said drive plate with said driven member, an energy absorbing flywheel in the form of a ring surrounding the axis of said driven member, and a rubber ring bonded to said flywheel and to portions of said disc thereby establishing a viscous connection between said flywheel and said discs, said flywheel and said damper spring means cooperating with the torque delivery elements of said clutch system to provide positive, hysteretic damping of vibration forces established during clutch engagement thereby achieving asymptotic stability of the system, said flywheel and said damper spring means being disposed radially inwardly from said pressure plate to provide minimum dimensions of the assembly.

References Cited by the Examiner
UNITED STATES PATENTS 2,065,601 12/1936 Meyer _____ 192—68
2,704,467 3/1955 Spase _____ 192—68 XR DAVID J. WILLIAMOWSKY, *Primary Examiner.*

B. W. WYCHE, *Assistant Examiner.*